United States Patent
Gulati et al.

(10) Patent No.: US 12,373,666 B2
(45) Date of Patent: **\*Jul. 29, 2025**

(54) CONVOLUTION-AUGMENTED TRANSFORMER MODELS

(71) Applicant: Google LLC, Mountain View, CA (US)

(72) Inventors: Anmol Gulati, New York, NY (US); Weikeng Qin, Sunnyvale, CA (US); Zhengdong Zhang, Mountain View, CA (US); Ruoming Pang, New York, NY (US); Niki Parmar, Mountain View, CA (US); Jiahui Yu, Jersey City, NJ (US); Wei Han, Mountain View, CA (US); Chung-Cheng Chiu, Mountain View, CA (US); Yu Zhang, Mountain View, CA (US); Yonghui Wu, Palo Alto, CA (US); Shibo Wang, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/766,038

(22) Filed: Jul. 8, 2024

(65) Prior Publication Data

US 2024/0362453 A1 Oct. 31, 2024

Related U.S. Application Data

(63) Continuation of application No. 17/139,525, filed on Dec. 31, 2020, now Pat. No. 12,079,703.

(51) Int. Cl.
*G06N 3/04* (2023.01)
*G06N 20/00* (2019.01)
*G10L 15/16* (2006.01)

(52) U.S. Cl.
CPC ............... *G06N 3/04* (2013.01); *G06N 20/00* (2019.01); *G10L 15/16* (2013.01)

(58) Field of Classification Search
CPC .......... G06N 3/04; G06N 20/00; G06N 3/045; G06N 3/082; G06N 3/084; G10L 15/16; G10L 21/0272
See application file for complete search history.

(56) References Cited

U.S. PATENT DOCUMENTS

2020/0349417 A1\* 11/2020 Achler ................. G06F 18/217
2021/0005182 A1   1/2021 Han et al.
(Continued)

OTHER PUBLICATIONS

Abdel-Hamid et al., "Convolutional Neural Networks for Speech Recognition", IEEE/ACM. Transactions on Audio, Speech, and Language Processing, vol. 22, No. 10, Oct. 2014, pp. 1533-1545.
(Continued)

*Primary Examiner* — Kc Chen
(74) *Attorney, Agent, or Firm* — DORITY & MANNING, P.A.

(57) ABSTRACT

Systems and methods can utilize a conformer model to process a data set for various data processing tasks, including, but not limited to, speech recognition, sound separation, protein synthesis determination, video or other image set analysis, and natural language processing. The conformer model can use feed-forward blocks, a self-attention block, and a convolution block to process data to learn global interactions and relative-offset-based local correlations of the input data.

20 Claims, 9 Drawing Sheets

(56) References Cited

U.S. PATENT DOCUMENTS

2021/0098074 A1 4/2021 Wu et al.
2022/0115006 A1 4/2022 Hori et al.

OTHER PUBLICATIONS

Bello et al., "Attention Augmented Convolutional Networks", Institute of Electrical and Electronics Engineers International Conference on Computer Vision, Seoul, South Korea, Oct. 27-Nov. 2, 2019, pp. 3286-3295.
Chiu et al., "State-of-the-Art Speech Recognition with Sequence-to-Sequence Models", 2018 Institute of Electrical and Electronics Engineers International Conference on Acoustics, Speech, and Signal Processing, Calgary, Alberta, Canada, Apr. 15-20, 2018, 13 pages.
Dai et al., "Transformer-XL: Attentive Language Models Beyond a Fixed-Length Context", arXiv:1901.02860v3, Jun. 2, 2019, 20 pages.
Dauphin et al., "Language Modeling with Gated Convolutional Networks", Thirty-Fourth International Conference on Machine Learning, Sydney, Australia, Aug. 6-11, 2017. 9 pages.
Dong et al., "Speech-Transformer: A No-Recurrence Sequence-to-Sequence Model for Speech Recognition", 2018 Institute of Electrical and Electronics Engineers Conference on Acoustics, Speech, and Signal Processing, Calgary, Alberta, Canada, Apr. 15-20, 2018, pp. 5884-5888.
Graves, "Sequence Transduction with Recurrent Neural Networks", arXiv:1211.3711vl, Nov. 14, 2012, 9 pages.
Han et al., "ContextNet: Improving Convolutional Neural Networks for Automatic Speech Recognition with Global Context", arXiv:2005.03191v3, May 16, 2020, 5 pages.
He et al., "Streaming End-To-End Speech Recognition for Mobile Devices", 2019 Institute of Electrical and Electronics Engineers International Conference on Acoustics, Speech, and Signal Processing, Brighton, The United Kingdom, May 12-17, 2019, 5 pages.
Hu et al., "Squeeze-and-Excitation Networks", 2018 IEEE/CVF Conference on Computer Vision and Pattern Recognition, Salt Lake City, Utah, United States, Jun. 18-23, 2018, pp. 7132-7141.
Jim et al., "An Analysis of Noise in Recurrent Neural Networks: Convergence and Generalization", Institute of Electrical and Electronics Engineers Transactions on Neural Networks, vol. 7, No. 6, Nov. 1996, 32 pages.
Karita et al., "A Comparative Study on Transformer vs RNN in Speech Applications", arXiv:1909.06317v2, Sep. 28, 2019, 8 pages.
Kingma et al., "Adam: A Method for Stochastic Optimization", arXiv:1412.6980v9, Jan. 30, 2017, 15 pages.
Kriman et al., "QuartzNet: Deep Automatic Speech Recognition with ID Time-Channel Separable Convolutions", arXiv:1910.10261vl, Oct. 22, 2019, 5 pages.
Li et al., "Jasper: An End-to-End Convolutional Neural Acoustic Model", arXiv:1904.03288v3, Aug. 27, 2019, 5 pages.
Lu et al., "Understanding and Improving Transformer from a Multi-Particle Dynamic System Point of View", arXiv:1906.02762v1, Jun. 6, 2019, 15 pages.
Nguyen et al., "Transformers without Tears: Improving the Normalization of Self-Attention", arXiv:1910.05895v2, Dec. 30, 2019, 11 pages.
Panayotov et al., "Librispeech: An ASR Corpus Based on Public Domain Audio Books", 2015 Institute of Electrical and Electronics Engineers International Conference on Acoustics, Speech and Signal Processing, Brisbane, Australia, Apr. 19-24, 2015, 5 pages.
Park et al., "SpecAugment on Large Scale Datasets", arXiv:1912.05533v1, Dec. 11, 2019, 5 pages.
Park et al., "SpecAugment: A Simple Data Augmentation Method for Automatic Speech Recognition", arXiv:1904.08779v3, Dec. 3, 2019, 6 pages.
Ramachandran et al., "Searching for Activation Functions", arXiv:1710.05941v2, Oct. 27, 2017, 13 pages.
Rao et al., "Exploring Architectures, Data and Units for Streaming End-To-End Speech Recognition with RNN-Transducer", arXiv:1801.00841v1, Jan. 2, 2018, 7 pages.
Sainath et al., "A Streaming On-Device End-To-End Model Surpassing Server-Side Conventional Model Quality and Latency", arXiv:2003.12710v1, Mar. 28, 2020, 5 pages.
Sainath et al., "Deep Convolutional Neural Networks For LVCSR", 2013 Institute of Electrical and Electronics Engineers International Conference on Acoustics, Speech and Signal Processing, Vancouver, Canada, May 26-31, 2013, 5 pages.
Shen et al., "LINGVO: A Modular and Scalable Framework for Sequence-to-Sequence Modeling", arXiv:1902.08295v1, Feb. 21, 2019, 17 pages.
Srivastava et al., "Dropout: A Simple Way to Prevent Neural Networks from Overfitting", Journal of Machine Learning Research, vol. 15, No. 56, 2014, pp. 1929-1958.
Synnaeve et al., "End-To-End ASR: From Supervised to Semi-Supervised Learning with Modern Architectures", arXiv:1911.08460vl, Nov. 19, 2019, 7 pages.
Vaswani et al., "Attention Is All You Need", Thirty-First Conference on Neural Information Processing Systems, Long Beach, California, United States, Dec. 4-9, 2017, 11 pages.
Wang et al., "Learning Deep Transformer Models for Machine Translation", Fifty-Seventh Annual Meeting of the Association for Computational Linguistics, Florence, Italy, Jul. 28-Aug. 2, 2019, pp. 1810-1822.
Wang et al., "Transformer-Based Acoustic Modeling for Hybrid Speech Recognition", arXiv:1910.09799v1, Oct. 22, 2019, 5 pages.
Wu et al., "Lite Transformer with Long-Short Range Attention", arXiv:2004.11886v1, Apr. 24, 2020, 13 pages.
Wu et al., "Pay Less Attention with Lightweight and Dynamic Convolutions", arXiv:1901.10430v2, Feb. 22, 2019, 14 pages.
Yang et al., "Convolutional Self-Attention Networks", arXiv: 1904.03107v1, Apr. 5, 2019, 7 pages.
Yu et al., "QaNet: Combining Local Convolution with Global Self-Attention for Reading Comprehension", arXiv: 1804.09541v1, Apr. 23, 2018, 16 pages.
Zhang et al., "Self-Attention and Dynamic Convolution Hybrid Model for Neural Machine Translation", 2020 Institute of Electrical and Electronics Engineers International Conference on Knowledge Graph, Nanjing, China, Aug. 9-11, 2020, pp. 352-259.
Zhang et al., "Transformer Transducer: A Streamable Speech Recognition Model with Transformer Encoders and RNN-T Loss", 2020 Institute of Electrical and Electronics Engineers International Conference on Acoustics, Speech and Signal Processing, Barcelona, Spain, May 4-8, 2020, 5 pages.

* cited by examiner

CONVOLUTION-AUGMENTED TRANSFORMER MODELS

PRIORITY CLAIM

The present application is a continuation of U.S. application Ser. No. 17/139,525 having a filing date of Dec. 31, 2020. Applicant claims priority to and the benefit of each of such application and incorporate all such application herein by reference in its entirety.

FIELD

The present disclosure relates generally to completing various data processing tasks. More particularly, the present disclosure relates to systems and methods for data processing using machine-learned models that feature both convolutions and self-attention such as convolutional-augmented Transformer models.

BACKGROUND

Various data processing tasks, including, as examples, speech recognition, natural language processing, protein synthesis determination, video analysis, etc., can require a large amount of sample data and computing power. In particular, performance on many of these tasks can be improved by using techniques which model dependencies within the data. However, modeling dependencies over a large amount of data can be significantly computationally demanding.

In the past, recurrent neural networks have been the de facto choice for automatic speech recognition systems. Recurrent neural networks can model the temporal dependencies in audio sequences efficiently. However, training for recurrent neural networks can be tedious, and long sequences can lead to processing errors.

More recently, self-attention-based models (e.g., Transformer models) and convolutional neural network-based models have shown promising results in Automatic Speech Recognition (ASR), outperforming Recurrent neural networks (RNNs). Transformer models are good at capturing content-based global interactions, while CNNs exploit local features effectively.

However, models with self-attention or convolutions each have their own limitations. While Transformers are good at modeling long-range global context, they are less capable of extracting fine-grained local feature patterns. On the other hand, convolutional neural networks exploit local information and are used as the de-facto computational block in vision. They learn shared position-based kernels over a local window, which maintain translation equivariance and are able to capture features like edges and shapes. One limitation of using local connectivity is that many more layers or parameters are required to capture global information. To combat this issue, certain contemporary works adopt the squeeze-and-excitation module in each residual block to capture longer context. However, it is still limited in capturing dynamic global context as it only applies a global averaging over the entire sequence.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. A computer-implemented method for processing local and global dependencies can include accessing data descriptive of a machine-learned conformer model that comprises one or more conformer blocks, each of the one or more conformer blocks configured to process a block input to generate a block output. Each of the one or more conformer blocks can include a first feed-forward block configured to process the block input to generate a first feed-forward output, a self-attention block configured to perform self-attention to process the first feed-forward output to generate an attention output, a convolutional block configured to perform convolutions with a convolutional filter to process the attention output of the self-attention block to generate a convolutional output, and a second feed-forward block configured to process the convolutional output of the convolutional block to generate a second feed-forward output. The method can include obtaining input data and processing the input data with the machine-learned conformer model to generate output data.

Another example aspect of the present disclosure is directed to a computing system. A computing system can include one or more processors and one or more non-transitory computer-readable media. The non-transitory computer-readable media can collectively store a machine-learned conformer model. In some implementations, the machine-learned conformer model can include a first feed-forward block, a self-attention block, a convolutional block configured to receive and process an output of the self-attention block, and a second feed-forward block. The non-transitory computer-readable media can collectively store instructions that, when executed by the one or more processors, cause the computing system to perform operations. The operations can include obtaining input data and processing the input data with the machine-learned conformer model to generate output data.

Another example aspect of the present disclosure is directed to one or more non-transitory computer-readable media. One or more non-transitory computer-readable media can collectively store instructions that, when executed by one or more computing devices, cause the one or more computing devices to perform operations. In some implementations, the operations include obtaining input data and processing the input data with a conformer model. The conformer model can include a first feed-forward block, a self-attention block, a convolutional block configured to receive and process an output of the self-attention block, and a second feed-forward block. In some implementations, in response to processing the input data with the conformer model, the operations can include generating an output data.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
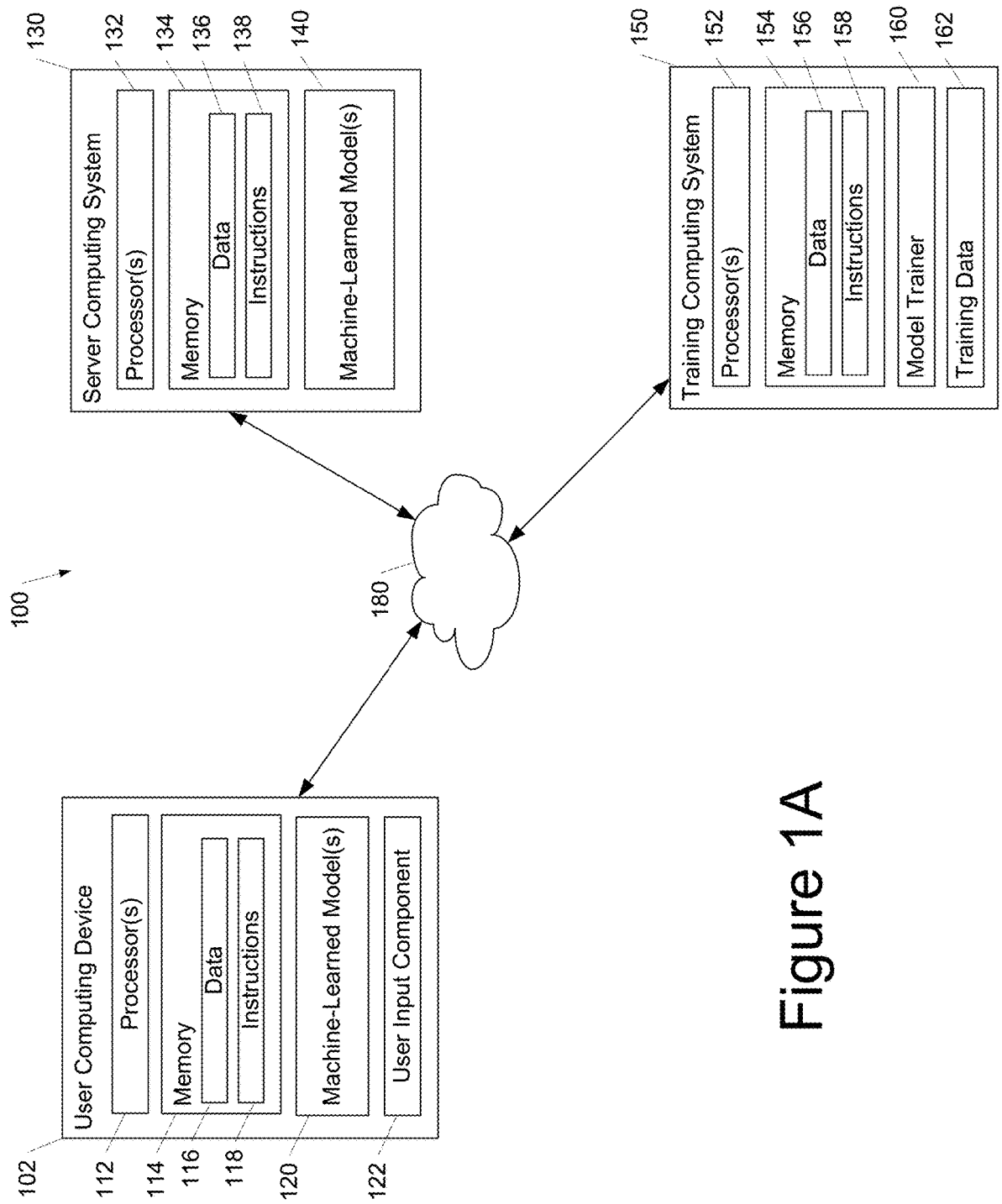
FIG. 1A depicts a block diagram of an example computing system according to example embodiments of the present disclosure.

Reference numerals that are repeated across plural figures are intended to identify the same features in various implementations.

DETAILED DESCRIPTION

Overview

Generally, the present disclosure relates to systems and methods for data processing using convolution-augmented Transformer models, which can be referred to as "conformer" models. The systems and methods may obtain input data and process the data with a machine-learned conformer model to generate an output. The machine-learned conformer model can include one or more conformer blocks. In one example, each conformer block may include two halves of a feed-forward block bookending a self-attention block and a convolution block. Moreover, the conformer block may be followed by a layer normalization block to normalize the output.

The machine-learned conformer models described herein achieve the benefits of both convolution neural networks and transformers to model both local and global dependencies of input data (e.g., an audio sequence) in a parameter-efficient way. The proposed models can be used for many different tasks, including, as examples, data processing tasks, including, as examples, speech recognition, natural language processing, protein synthesis determination, video analysis, etc.

Example implementations of the present disclosure applied to speech recognition significantly outperform the previous Transformer and CNN based models achieving state-of-the-art accuracies. For example, on the widely used LibriSpeech benchmark, example implementations of the proposed model achieve WER of 2.1%/4.3% without using a language model and 1.9%/3.9% with an external language model on test/testother. Competitive performance of 2.7%/6.3% is also observed with a relatively smaller model of only 10 M parameters.

More particularly, in some example implementations, a computing system or method can obtain input data, which may be processed by a model that contains one or more conformer blocks to generate output data. Each conformer block can include a first feed-forward block, a self-attention block, a convolution block, and a second feed-forward block. In some implementations, the feed-forward blocks may sandwich the self-attention block and the convolution block. Therefore, the input data to the conformer block may be input into the first feed-forward block, and the output data from the conformer block may be output from the second feed-forward block.

Thus, conformer models may benefit from the strengths of transformer models and the strengths of convolutional neural networks. A conformer model can include the basic architecture of a transformer with the addition of a convolution block and macaron feed-forward structure.

One valuable part of a transformer model that can be included in a conformer model is a self-attention block. A self-attention block can aid the model in processing a set of inputs and generating generalizations among a set of outputs. In some implementations, the self-attention block can be a multi-headed self-attention block. The multi-headed self-attention block may include a relative sinusoidal positional encoding scheme. The relative sinusoidal positional encoding can allow the block to generalize on different input lengths and may allow the encoder to be more robust to the variance of data sizes. In some implementations, the self-attention block can include a layernorm, a multi-head attention with relative positional embedding, and a dropout.

A convolutional neural network or a convolution block can be used in a conformer model to complement the self-attention block by extracting local correlations. The local correlations paired with the global generalizations determined by the self-attention block can allow the conformer model to complete a variety of tasks, including but not limited to speech recognition, protein data processing, natural language processing, video or other image set analysis, and sound separation. In some implementations, the convolution block can include one of, a combination of, or all of: a layernorm, a first pointwise convolution, a gated linear unit (GLU) activation, a 1-D depthwise convolution layer, a batchnorm, a Swish activation, a second pointwise convolution, and a dropout. The convolution block may start with a gating mechanism that consists of the first pointwise convolution and the GLU. The gated mechanism may be followed by the single 1-D depthwise convolution layer, which is followed by the batchnorm to aid in training the block. In some implementations, a group norm can be used in place of a batchnorm.

The system or method can include two feed-forward blocks. The first feed-forward block may be before the self-attention block, and the second feed-forward block may be after the convolution block. The feed-forward blocks may be half-step feed-forward blocks with half scaling for each block. Thus, the first feed-forward block and the second feed-forward block can be half-step feed-forward blocks, in which the feed-forward blocks may have half-step residual weights.

In some implementations, the feed-forward blocks can include one of, or a combination of the following: a layernorm, a first linear transformation, a Swish activation, a first dropout, a second linear transformation, and a second dropout. The blocks may utilize a variety of activation functions between the two linear transformations. The feed-forward blocks may include residual connections across the sub-blocks.

Moreover, in some implementations, each block may feed into the next block with the first feed-forward block feeding into the self-attention block, the self-attention block feeding into the convolution block, and the convolution block feeding into the second feed-forward block, and so on. Each block may generate an output, and each block following another block may be configured to intake the output of the previous block. Thus, in some implementations, the one or more conformer blocks may be a plurality of conformer blocks stacked in a sequence one after the other.

In some implementations, the second feed-forward block may be followed by a layernorm block to normalize the data. In some implementations, the first feed-forward block, the self-attention block, the convolutional block, and the second feed-forward block each have a respective residual connection.

In some implementations, the self-attention block may be a multi-headed self-attention block. The convolution block may include a pointwise convolution and a gated linear unit (GLU). The feed-forward block may include applying a layer normalization on the input before a first linear layer. Moreover, the feed-forward blocks may further include applying a Swish activation and dropout to regularize the network. In some implementations, the feed-forward blocks can include a half-step feed-forward layer per block. The second feed-forward block may be followed by a final layernorm layer. The resulting encoding of the conformer model may then be decoded to output text data descriptive of the speech from the encoded audio data.

Convolutional neural networks paired with self-attention models (e.g., as in the conformer block) can learn both position-wise local features and use content-based global interactions. Furthermore, feeding data through a convolution block after being processed by a self-attention block can increase efficiency and accuracy compared to parallel processing followed by convolution of the outputs. Furthermore, sandwiching the blocks between two feed-forward blocks can lighten the computational load, lessening the computing power needed.

In some implementations, the conformer model can be used as an audio encoder for speech recognition tasks. The audio encoder can first process the input with a convolution subsampling layer and then with one or more conformer blocks. Conformer blocks may be used in place of Transformer blocks or recurrent neural networks (RNNs).

More particularly, in some implementations, the systems and methods can obtain audio data. For example, the audio data can include speech data. The audio data may be processed with an encoder to generate an encoding. The encoder may include one or more feed forward blocks, a self-attention block, and a convolution block. In some implementations, the system may then process the encoding with a decoder to generate a decoder data output. The decoder may include one or more feed forward blocks, a self-attention block, and a convolution block. Last, the system may generate speech recognized data based at least in part on the decoder data output. In some implementations, the decoder data output may include a global interaction for the audio data and the relative-offset-based local correlations.

In some implementations, the self-attention block may include a multi-headed self-attention block. The self-attention block comprises a layer normalization block before a multi-head attention with relative positional embedding block. The self-attention block may further include a dropout block after the multi-head attention with relative positional embedding block.

In some implementations, the convolution block may include a pointwise convolution block followed by a gated linear unit (GLU) activation. In some implementations, the convolution block may include a 1D depthwise convolution block followed by a Swish activation. The convolution block can include a layer normalization block, a first pointwise convolution block, a second pointwise convolution block, and a dropout block.

The first feed-forward block and the second feed-forward block may include a respective half-step feed-forward block for each block. The conformer blocks may include a layer normalization block configured to normalize the second feed-forward output to generate the block output. The first feed-forward block may include a first linear layer, a swish activation, and a second linear layer. Furthermore, the second feed-forward block may include a first linear layer, a swish activation, and a second linear layer.

The systems and methods disclosed herein can be used for a variety of tasks and may be implemented in an assortment of manners. In some implementations, the conformer model can be used for speech recognition. As an example, the input data may be spectrograph data descriptive of human speech, and the output data may be speech recognized data for the human speech.

In some implementations, the conformer model can be used for sound separation and/or cancellation. The input data may be spectrograph data descriptive of audio data, and the output data may be sound separation data for the audio data.

In some implementations, the conformer model can be used to process protein data. The input data may be protein data that textually describes a structure of a protein, and the output data may be protein synthesis data.

In some implementations, the conformer model can be used for natural language processing. The input data may be natural language data, and the output data may be a language embedding for the natural language data. The conformer model may also be used to process longer forms of context and/or may be used to process data collected further away from sensors. The conformer model may also be used for automatic machine translation (e.g., English to German).

Thus, the systems and methods of the present disclosure creatively combine convolutions with self-attention, for example in ASR models. Both global and local interactions are important for being parameter efficient. To achieve this, the conformer model provides a novel combination of self-attention and convolution will achieve the best of both worlds-self-attention learns the global interaction whilst the convolutions efficiently capture the relative-offset-based local correlations.

The systems and methods of the present disclosure provide a number of technical effects and benefits. As one example, the system and methods can utilize a conformer model (e.g., which represents a combination of a convolutional neural network and a transformer model) to exploit local features while also capturing content-based global interactions. The systems and methods can achieve a very low word error rate for speech recognition, and the systems and methods can also be applied to other fields to increase efficiency. Furthermore, the systems and methods can decrease data collection burdens (e.g., not requiring a large language model for speech recognition) and can decrease the computing power needed for computation. As the systems and methods can utilize parameter-efficient processing which captures both local and global dependencies, the conformer model can reduce the computational power needed to perform various data processing tasks, thereby conserving computing resources such as processor usage, memory usage, network bandwidth, etc.

Another technical benefit of the systems and methods of the present disclosure is the ability to process protein data to determine protein synthesis data. The systems and methods can also be used for efficient natural language processing. The textual processing with a conformer model can also lead to a conservation of computing resources.

Example implementations of the proposed conformer models achieve state-of-the-art results on LibriSpeech, outperforming the previous best published Transformer Transducer by 15% relative improvement on the testother dataset with an external language model. Three example models are described in detail based on model parameter limit constraints of 10 M, 30 M and 118 M. The 10 M model shows an improvement when compared to similar sized contemporary work with 2.7%/6.3% on test/testother datasets. The medium 30 M parameters-sized model already outperforms transformer transducer published in which uses 139 M model parameters. The relatively larger 118 M parameter model is able to achieve 2.1%/4.3% without using language models and 1.9%/3.9% with an external language model.

Additional description is provided regarding the effects of the number of attention heads, convolution kernel sizes, activation functions, placement of feed-forward layers, and different strategies of adding convolution modules to a Transformer-based network and shed light on how each contributes to the accuracy improvements.

With reference now to the Figures, example embodiments of the present disclosure will be discussed in further detail.

Example Devices and Systems

FIG. 1A depicts a block diagram of an example computing system 100 that performs data processing according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more conformer models 120. For example, the conformer models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example conformer models 120 are discussed with reference to FIGS. 4-7.

In some implementations, the one or more conformer models 120 can be received from the server computing system 130 over network 180, stored in the user computing device memory 114, and then used or otherwise implemented by the one or more processors 112. In some implementations, the user computing device 102 can implement multiple parallel instances of a single conformer model 120.

More particularly, the conformer model can be used for various data processing tasks. The tasks may include speech recognition, natural language processing, sound separation, protein data processing, or a variety of other tasks. The models can be used to obtain data, process data with a conformer model including one or more conformer blocks to generate an output. The one or more conformer blocks can include a first feed forward block, a self-attention block, a convolution block, and a second feed forward block. The two feed forward blocks may be half-step feed forward blocks, and each block may be configured to receive and process the output of the block preceding it.

Additionally or alternatively, one or more conformer models 140 can be included in or otherwise stored and implemented by the server computing system 130 that communicates with the user computing device 102 according to a client-server relationship. For example, the conformer models 140 can be implemented by the server computing system 140 as a portion of a web service (e.g., a speech recognition service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned conformer models 140. For example, the models 140 can be or can otherwise include various machine-learned models.

Example machine-learned models include neural networks or other multi-layer non-linear models. Example neural networks include feed forward neural networks, deep neural networks, recurrent neural networks, and convolutional neural networks. Example models 140 are discussed with reference to FIGS. 4-7.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the conformer models 120 and/or 140 based on a set of training data 162. The training data 162 can include, for example, a language set, protein correlation data, sound clips, or variety of other data sets indicative of a determined task.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
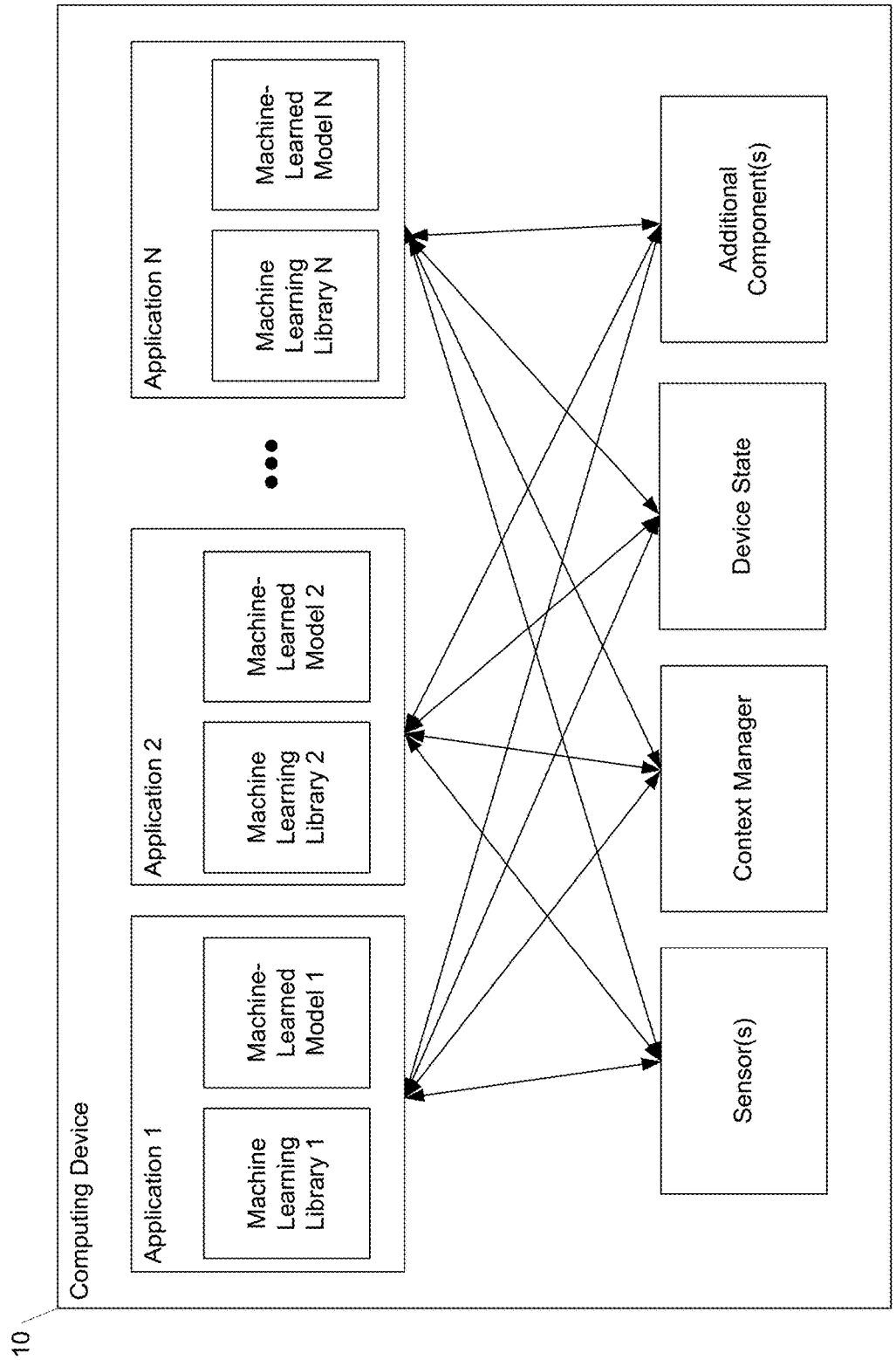
FIG. 1B depicts a block diagram of an example computing device according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
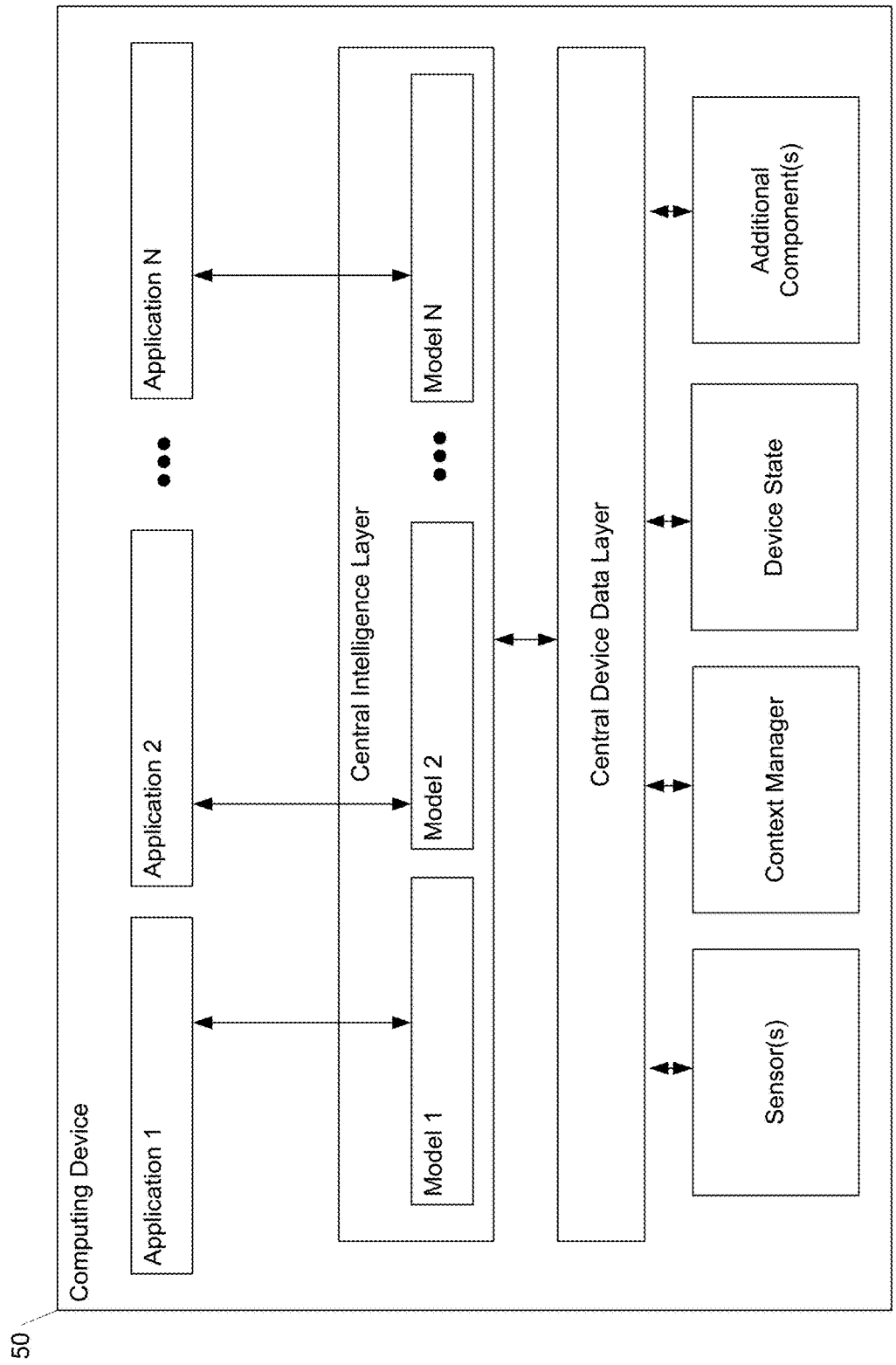
FIG. 1C depicts a block diagram of an example computing system according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Transformer architectures based on self-attention can efficiently model sequences due to the model's ability to capture long distance interactions. Furthermore, transformer architectures can have high training efficiency. Moreover, Transformer models can model long-range global context, but transformer models can struggle to extract fine-grained local feature patterns. Convolution neural networks (CNNs) can exploit local information and can be used as the de-facto computational block in computer vision applications. CNNs can learn shared position-based kernels over a local window, which may maintain translation equivariance and can be able to capture features like edges and shapes. Convolutions can capture local context progressively via a local receptive field layer by layer.

In some implementations, the conformer model can be used for speech recognition or as an audio encoder. The conformer model can first process the input with a convolution subsampling layer, and then with a number of conformer blocks.

Figure 4:
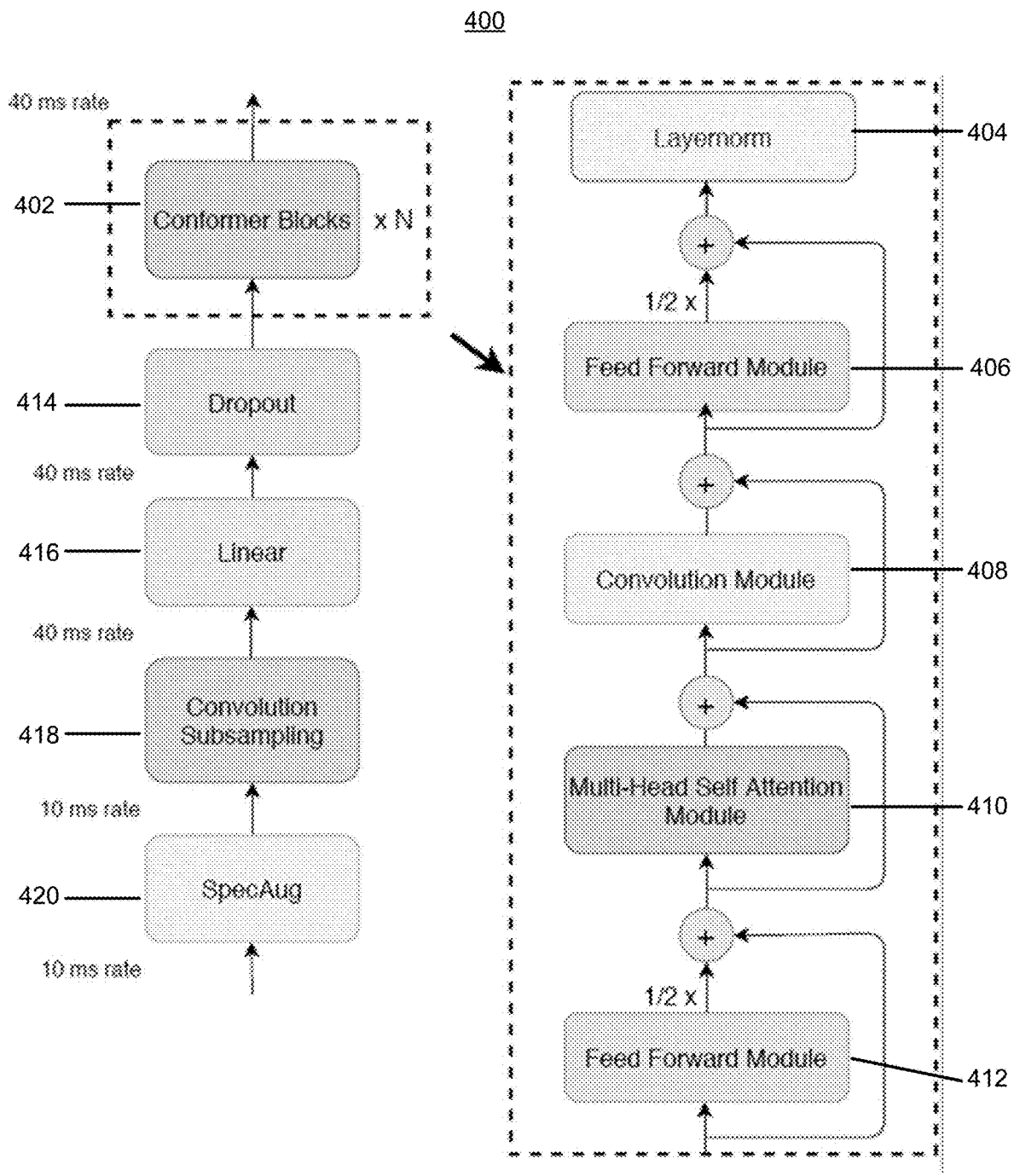
FIG. 4 depicts a block diagram of an example conformer encoder model architecture according to example embodiments of the present disclosure.

In some implementations, as depicted in FIG. 4, a conformer block 402 can be composed of four blocks stacked together (e.g., a first feed-forward block 412, a self-attention block 410, a convolution block 408, and a second feed-forward block 406). The four blocks may be arranged with the convolution block 408 receiving the output of the self-attention block 410, and the feed-forward blocks 412 and 406 may book-end the other two blocks 410 and 408.

The conformer model may use a multi-headed self-attention (MHSA) 410 while, in some implementations, integrating a relative sinusoidal positional encoding scheme. The relative positional encoding can allow the self-attention module to generalize better on different input lengths, and the resulting encoder can be more robust to the variance of utterance lengths in speech recognition applications. The conformer model can use pre-norm residual units with dropout, which helps training and helps in regularizing deeper models.

The convolution block 408 can start with a gating mechanism made up of a pointwise convolution and a gated linear unit (GLU). The gating mechanism may be followed by a single 1-D depthwise convolution layer. Batchnorm can be deployed just after the convolution to aid in training deep models. In some implementations, the batchnorm can be replaced with a group norm.

The conformer model can follow pre-norm residual units, and the conformer model can apply layer normalization within the residual unit and on the input before the first linear layer. In some implementations, the conformer model applies Swish activation and dropout, which helps with regularizing the network.

The conformer model can contain two feed-forward blocks sandwiching the multi-headed self-attention block 410 and the convolution block 408. Furthermore, the system or method may use half-step residual weights in the feed-forward (FFN) blocks. Moreover, in some implementations, the second feed-forward block 406 can be followed by a final layernorm layer 404. Mathematically, this means, for input $x_i$ to a conformer model, or block i, the output $y_i$ of the block is:

$$\tilde{x}_i = x_i + \frac{1}{2} FFN(x_i)$$

$$x'_i = \tilde{x}_i + MHSA(\tilde{x}_i)$$

$$x''_i = x'_i + Conv(x'_i)$$

$$y_i = Layernorm\left(x''_i + \frac{1}{2} FFN(x''_i)\right)$$

where FFN refers to a feed-forward block, MHSA refers to a multi-headed self-attention block, and Conv refers to a convolution block.

Two feed-forward layers with half-step residual connections sandwiching the attention and convolution modules in between can provide a significant improvement over having a single feed-forward module in a model architecture.

Thus, FIG. 4 depicts a block diagram of an example conformer model 400 according to example embodiments of the present disclosure. In some implementations, the conformer model 400 is trained to receive a set of input data descriptive of human speech and, as a result of receipt of the input data, provide output data that interprets the speech into text. In some other implementations, the conformer model 400 is trained to receive a set of input data descriptive of a protein and, as a result of receipt of the input data, provide output data that includes protein synthesis data. Thus, in some implementations, the conformer model 400 can include a first feed-forward block 412, a self-attention block 410, a convolution block 408, and a second feed-forward block 406 that are operable to process data.

In particular, FIG. 4 depicts one implementation of a conformer encoder model architecture. In this implementation, the conformer blocks 402 can obtain input data that has first been processed by a SpecAugment block 420, a convolution subsampling block 418, a linear transformation block 416, and a dropout block 414. The SpecAugment block 420 may provide a pre-conformer block processing step to the input data. The SpecAugment block 420 can aid the conformer blocks in processing data for speech recognition. Furthermore, in some implementations, a convolution subsampling block 418 can subsample the input data before being processed by the conformer block 402. The a following linear transformation block 416 and dropout block 414 can further prepare the input data for conformer block 402 processing.

In this implementation, the conformer block 402 includes two macaron-like feed-forward blocks 406 and 412 with half-step residual connections sandwiching the multi-headed self-attention block 410 and the convolution block 408. The macaron structure can be followed by a post layernorm 404. The half-step feed forward blocks can add computational efficiency, and the pairing of the self-attention block 410 and the convolution block 408 can provide for both local and global correlations being captured. Finally, the layernorm block 404 can normalize the output of the sandwiched structure.

Figure 5:
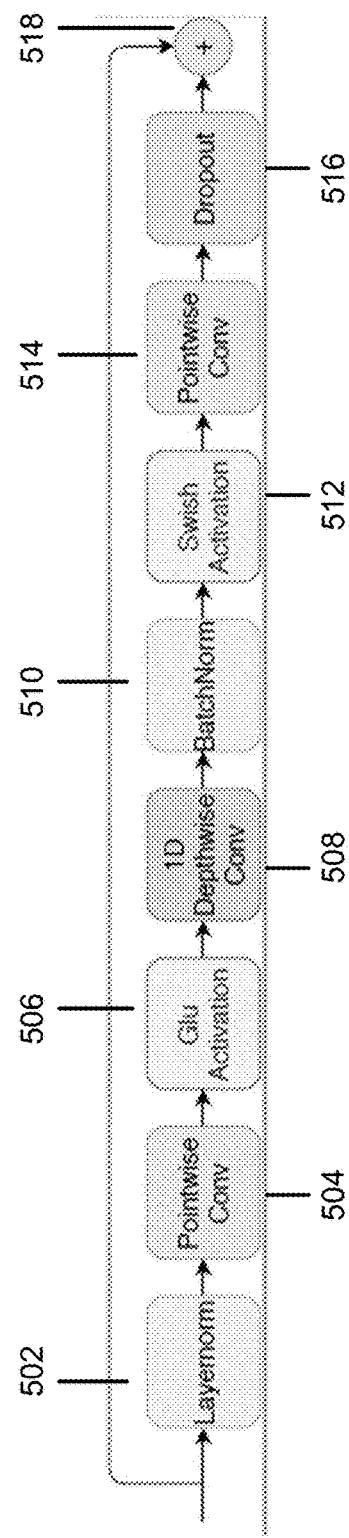
FIG. 5 depicts a block diagram of an example convolution block according to example embodiments of the present disclosure.

FIG. 5 depicts a block diagram of an example convolution block 500 according to example embodiments of the present disclosure. The convolution block 500 can be implemented into the conformer model 400 of FIG. 4 as the convolution block 408.

The example convolution block 500 of FIG. 5 can learn and capture relative-offset-based local correlations. The depicted architecture can benefit from the efficiency provided by a normalized input being processed by a gating mechanism including a pointwise convolution 504 and a gated linear unit activation block 506. In particular, the convolution block 500 of FIG. 5 can contain layernorm block 502 feeding into a pointwise convolution 504 with an expansion factor of 2 projecting the number of channels with a GLU activation layer 506 gating over half the channel inputs, followed by a 1-D Depthwise convolution 508. The 1-D depthwise convolution 508 can be followed by a batchnorm 510 and then a swish activation layer 512. In this implementation, the swish activation 512 then feeds into a pointwise convolution 514, which is followed by a dropout block 518. Furthermore, the depicted implementation may be configured to intake the output of a self-attention block to generate convolution output data 518, which can be processed by a feed-forward block.

Figure 6:
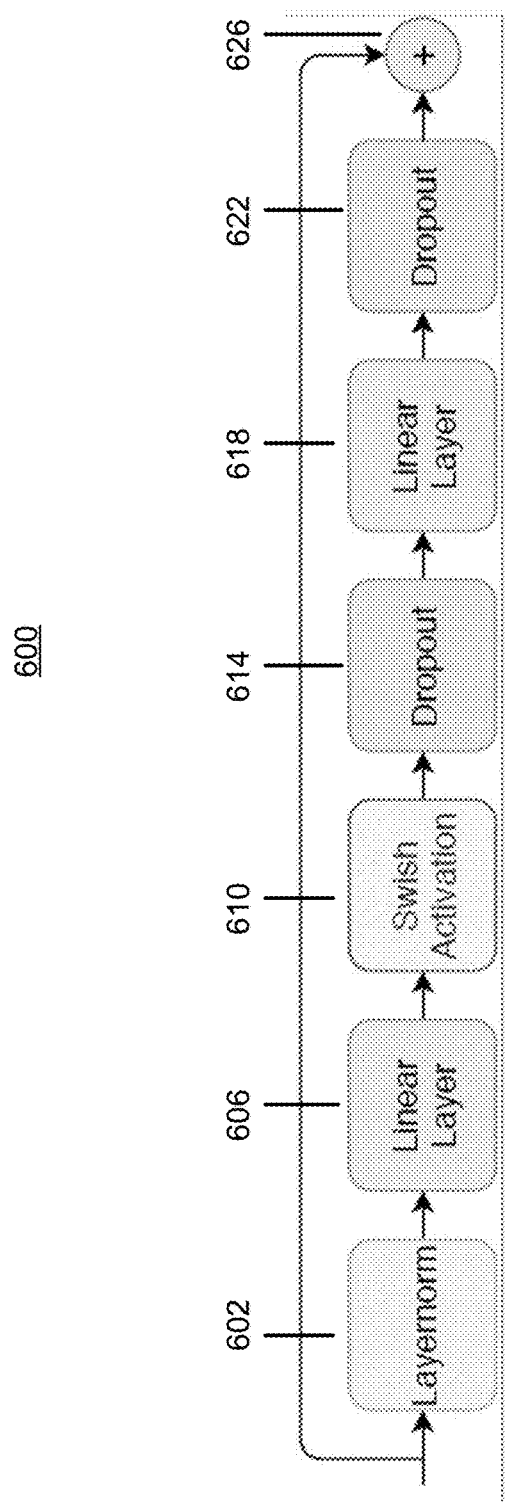
FIG. 6 depicts a block diagram of an example multi-headed self-attention block according to example embodiments of the present disclosure.

FIG. 6 depicts a block diagram of an example feed forward block 600 according to example embodiments of the present disclosure. The feed forward block 600 can be implemented into the conformer model 400 of FIG. 4 as either a first feed-forward block 412 or a second feed-forward block 406.

In particular, FIG. 6 depicts one implementation of a feed-forward block with six sub-blocks. The six sub-locks in this implementation include a layernorm block 602, a first linear transformation block 606, a swish activation block 610, a dropout block 614, a second linear transformation block 618, and a dropout block 622. In some implementations, the first linear transformation block 606 may use an expansion factor of 4, and the second linear transformation block 618 may project the data back to the model dimension. The system or method may use a swish activation block 610 and pre-norm residual units in both feed-forward blocks. For the first feed-forward block, the output data 626 may be a first feed-forward output data 626, which can be processed by a self-attention block. For the second feed-forward block, the block may obtain input data, process the input data, and generate a second feed-forward output data, which may be the final output data for the conformer block.

Figure 7:
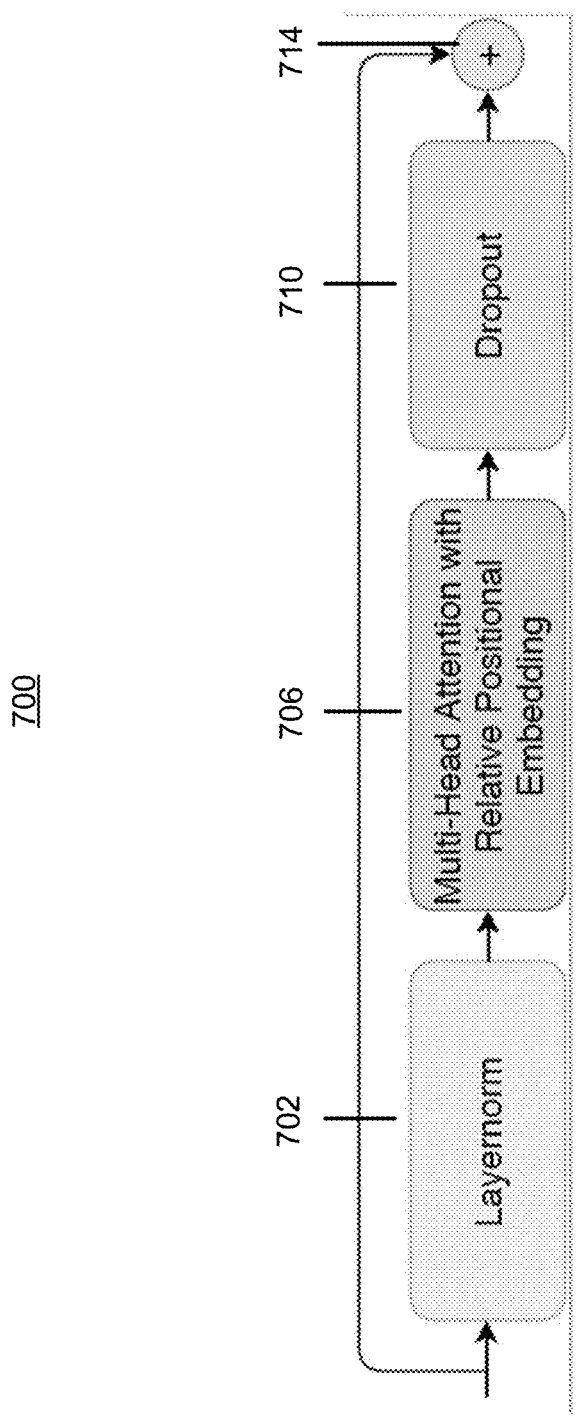
FIG. 7 depicts a block diagram of an example feed-forward block according to example embodiments of the present disclosure.

FIG. 7 depicts a block diagram of an example self-attention block 700 according to example embodiments of the present disclosure. The self-attention block 700 can be implemented into the conformer model 400 of FIG. 4 as the self-attention block 410.

In particular, FIG. 7 depicts one implementation of a multi-headed self-attention block with three sub-blocks. In this implementation, the three sub-blocks include a layer-norm block 702, a multi-head attention block 706, and a dropout block 710. The system or method may use a multi-headed self-attention with relative positional embedding in a pre-norm residual unit. Furthermore, the depicted implementation may be configured to intake the output of a feed forward block to generate attention output data 714, which can be processed by a convolution block.

Example Experiments

Example implementations of the systems and methods described herein were evaluated on the LibriSpeech dataset, which consists of 970 hours of labeled speech and an additional 800 M word token text-only corpus for building language models. Testing can further include the utilization of extracted 80-channel filterbanks features computed from a 25 ms window with a stride of 10 ms. During testing, the system can use SpecAugment with mask parameter (F=27), and ten time masks with maximum time-mask ratio ($p_s$=0.05), where the maximum-size of the time mask is set to $p_s$ times the length of the utterance.

The systems and methods can be implemented with various model sizes. Three example models can include: small, medium, and large, with 10 M, 30 M, and 118 M params, respectively, by sweeping different combinations of network depth, model dimensions, number of attention heads and choosing the best performing one within model parameter size constraints. The systems and methods can use a single-LSTM-layer decoder in all model sizes. Table 1 describes their architecture hyper-parameters.

Moreover, Table 1 depicts example model hyper-parameters for example conformer S, M, and L models, found via sweeping different combinations and choosing the best performing models within the parameter limits.

TABLE 1

| Model | Conformer (S) | Conformer (M) | Conformer (L) |
|---|---|---|---|
| Num Params (M) | 10.3 | 30.7 | 118.8 |
| Encoder Layers | 16 | 16 | 17 |
| Encoder Dim | 144 | 256 | 512 |
| Attention Heads | 4 | 4 | 8 |
| Conv Kernel Size | 32 | 32 | 32 |

For regularization, the system can apply dropout in each residual unit of the conformer, before being added to the module input. In some implementations, the system can use a rate of $P_{drop}=0.1$. Variational noise can be introduced to the model as a regularization. A $l_2$ regularization with 1e-6 weight can also be added to all the trainable weights in the network. The models can be trained with the Adam optimizer with $\beta_1=0.9$, $\beta_2=0.98$, and $\varepsilon=10^{-9}$ and a transformer learning rate schedule, with 10 k warm-up steps and peak learning rate $0.05/\sqrt{d}$ where d is the model dimension in the conformer encoder.

In some implementations, the system can use a 3-layer LSTM language model (LM) with width 4096 trained on the LibriSpeech language model corpus with the LibriSpeech 960 h transcripts added, tokenized with the 1 k WPM built from LibriSpeech 960 h. The LM can have a word-level perplexity 63.9 on the dev-set transcripts. The LM weight $\lambda$ for shallow fusion can be tuned on the dev-set via grid search. Models may be implemented with Lingvo toolkit.

Table 2 compares the word error rate (WER) result of the model on LibriSpeech test-clean/test-other with a few state-of-the-art models including: ContextNet, Transformer transducer, and QuartzNet. All evaluation results round up to 1 digit after decimal point.

Moreover, Table 2 depicts an example comparison of conformer with recent published models. The conformer model can show improvements consistently over various model parameter size constraints. At 10.3 M parameters, the model can perform 0.7% better on testother when compared to contemporary work, ContextNet(S). At 30.7 M model parameters, the conformer model can significantly outperform the previous published state of the art results of Transformer Transducer with 139 M parameters.

TABLE 2

| Method | #Params(M) | WER Without LM | | WER With LM | |
| --- | --- | --- | --- | --- | --- |
| | | testclean | testother | testclean | testother |
| Hybrid | | | | | |
| Transformer | — | — | — | 2.26 | 4.85 |
| CTC | | | | | |
| QuartzNet | 19 | 3.9 | 11.28 | 2.69 | 7.25 |
| LAS | | | | | |
| Transformer | 270 | 2.89 | 6.98 | 2.33 | 5.17 |
| Transformer | — | 2.2 | 5.6 | 2.6 | 5.7 |
| LSTM | 360 | 2.6 | 6 | 2.2 | 5.2 |
| Transducer | | | | | |
| Transformer | 139 | 2.4 | 5.6 | 2 | 4.6 |
| ContextNet(S) | 10.8 | 2.9 | 7 | 2.3 | 5.5 |
| ContextNet(M) | 31.4 | 2.4 | 5.4 | 2 | 4.5 |
| ContextNet(L) | 112.7 | 2.1 | 4.6 | 1.9 | 4.1 |
| Conformer | | | | | |
| Conformer(S) | 10.3 | 2.7 | 6.3 | 2.1 | 5 |
| Conformer(M) | 30.7 | 2.3 | 5 | 2 | 4.3 |
| Conformer(L) | 118.8 | 2.1 | 4.3 | 1.9 | 3.9 |

Without a language model, the performance of the medium model can already achieve competitive results of 2.3/5.0 on test/testother outperforming the best known Transformer, LSTM based model, or a similar sized convolution model. With the language model added, the model can achieve the lowest word error rate among all the existing models. The table demonstrates the effectiveness of combining Transformer and convolution in a single neural network.

A conformer block can differ from a Transformer block in a number of ways, in particular, the inclusion of a convolution block and having a pair of FFNs surrounding the block in the Macaron-style. Table 3 shows the impact of each change to an example conformer block. Among all differences, convolution sub-block can be the most impactful feature, while having a Macaron-style FFN pair can also add efficiency over a single FFN of the same number of parameters.

Furthermore, Table 3 depicts a study on deconstructing an example conformer. Starting from a conformer block, the experiment removes several example features and moves towards a vanilla Transformer block. The steps include: (1) replacing SWISH with ReLU; (2) removing the convolution sub-block; (3) replacing the Macaron-style FFN pairs with a single FFN; (4) replacing self-attention with relative positional embedding with a vanilla self-attention layer. All ablation study results can be evaluated without the external LM.

TABLE 3

| Model Architecture | dev clean | dev other | test clean | test other |
| --- | --- | --- | --- | --- |
| Conformer Model | 1.9 | 4.4 | 2.1 | 4.3 |
| SWISH + ReLU | 1.9 | 4.4 | 2.0 | 4.5 |
| Convolution Block | 2.1 | 4.8 | 2.1 | 4.9 |
| Macaron FFN | 2.1 | 5.1 | 2.1 | 5.0 |
| Relative Pos. Emb. | 2.3 | 5.8 | 2.4 | 5.6 |

The conformer model may utilize a variety of activation functions, including, but not limited to, a swish activation and/or GLU activation. Using swish activations can lead to faster convergence in the conformer models. Furthermore, using swish activations can lead to faster convergence in the conformer models.

The system can involve different ways of combining the multi-headed self-attention (MHSA) module with the convolution module for different implementations. One example configuration can include replacing the depthwise convolution in the convolution module with a lightweight convolution. Another example includes placing the convolution module before the MHSA module in the conformer model, which can degrade the results by 0.1 on dev-other. A possible competing architecture can involve splitting the input into parallel branches of a multi-headed self-attention module and a convolution module with the outputs concatenated. Testing can show that this worsens the performance when compared to the conformer proposed architecture.

The results in Table 4 can display the advantage of placing the convolution module after the self-attention module in the conformer block.

Table 4 depicts an ablation study of an example conformer attention convolution blocks. The study includes varying the combination of the convolution block with the multi-headed self-attention: (1) Conformer architecture; (2) Using Lightweight convolutions instead of depthwise convolution in the convolution block in Conformer; (3) Convolution before multi-headed self-attention; (4) Convolution and MHSA in parallel with their output concatenated.

TABLE 4

| Model Architecture | dev clean | dev other |
| --- | --- | --- |
| Conformer | 1.9 | 4.4 |
| Depthwise conv + Lightweight convolution | 2.0 | 4.8 |
| Convolution block before MHSA | 1.9 | 4.5 |
| Parallel MHSA and Convolution | 2.0 | 4.9 |

Instead of a single feed-forward module (FFN) post the attention blocks as in the Transformer models, the conformer block can have a pair of macaron-like feed-forward modules sandwiching the self-attention and convolution modules. Further, the conformer feed-forward modules can be used with half-step residuals. Table 5 can show the impact of changing an example conformer block to use a single FFN or full-step residuals.

Table 5 depicts an ablation study of an example macaron-net feed-forward module architecture. The study includes ablating the differences between the conformer feed-forward module with that of a single FFN used in Transformer models: (1) Conformer; (2) Conformer with full-step residuals in Feed forward modules; (3) replacing the Macaron-style FFN pair with a single FFN.

TABLE 5

| Model Architecture | dev clean | dev other | test clean | test other |
| --- | --- | --- | --- | --- |
| Conformer | 1.9 | 4.4 | 2.1 | 4.3 |
| Single FFN | 1.9 | 4.5 | 2.1 | 4.5 |
| Full step residuals | 1.9 | 4.5 | 2.1 | 4.5 |

In self-attention, each attention head can learn to focus on different parts of the input, making it possible to improve predictions beyond the simple weighted average. The conformer model may have varying numbers of attention heads. In some implementations, the conformer model's self-attention block can have 16 attention heads. Experiments have been performed to study the effect of varying the number of attention heads from 4 to 32 in our large model, using the same number of heads in all layers. The results find that increasing attention heads up to 16 can improve the accuracy, especially over the devother datasets, as shown in Table 6.

Table 6 depicts an ablation study on the attention heads in an example multi-headed self-attention.

TABLE 6

| Attention Heads | Dim per Head | dev clean | dev other | test clean | test other |
| --- | --- | --- | --- | --- | --- |
| 4 | 128 | 1.9 | 4.6 | 2.0 | 4.5 |
| 8 | 64 | 1.9 | 4.4 | 2.1 | 4.3 |
| 16 | 32 | 2.0 | 4.3 | 2.2 | 4.4 |
| 32 | 16 | 1.9 | 4.4 | 2.1 | 4.5 |

The conformer model can have varying kernel sizes, including but not limited to 3, 7, 17, 32, or 65. The conformer model may use the same kernel size for all layers. To study the effect of kernel sizes in the depthwise convolution, the kernel size in {3, 7, 17, 32, 65} of the large model were swept, using the same kernel size for all layers. The resulting performance can improve with larger kernel sizes until kernel sizes 17 and 32 but can worsen in the case of kernel size 65, as shown in Table 7. On comparing the second decimal in dev WER, the table shows kernel size 32 can perform better than the other tested kernel sizes.

Table 7 depicts an ablation study on an example depthwise convolution kernel sizes.

TABLE 7

| Kernel size | dev clean | dev other | test clean | test other |
|---|---|---|---|---|
| 3 | 1.88 | 4.41 | 1.99 | 4.39 |
| 7 | 1.88 | 4.30 | 2.02 | 4.44 |
| 17 | 1.87 | 4.31 | 2.04 | 4.38 |
| 32 | 1.83 | 4.30 | 2.03 | 4.29 |
| 65 | 1.89 | 4.47 | 1.98 | 4.46 |

A conformer architecture can integrate components from CNNs and Transformers for end-to-end speech recognition. The inclusion of convolution modules can enhance the performance of the conformer model. The model can exhibit better accuracy with fewer parameters than previous work on the LibriSpeech dataset and can achieve a new state-of-the-art performance at 1.9%/3.9% for test/testother.

Example Methods

Figure 2:
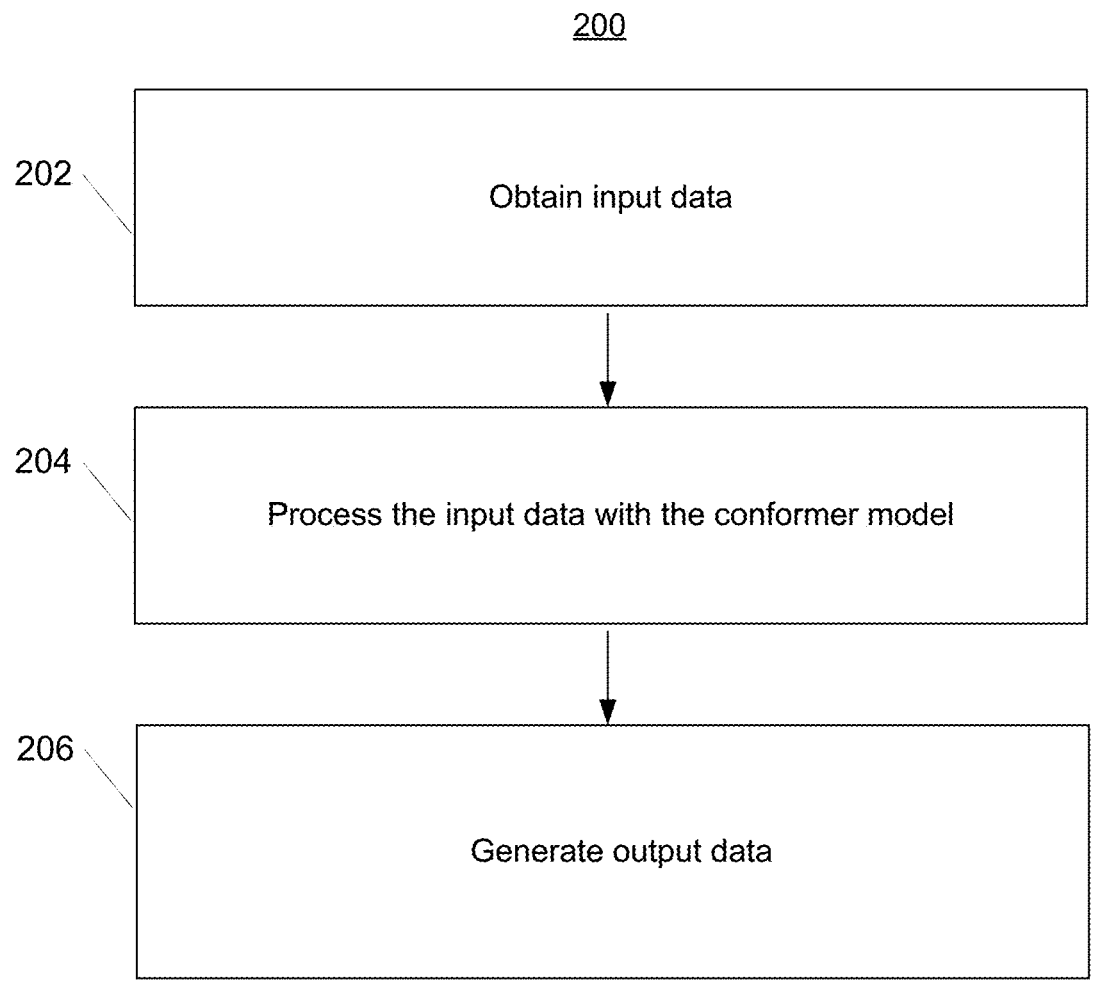
FIG. 2 depicts a flow chart of an example method for generating output data with a conformer model according to example embodiments of the present disclosure.

FIG. 2 depicts a flow chart diagram of an example method to perform according to example embodiments of the present disclosure. Although FIG. 2 depicts steps performed in a particular order for purposes of illustration and discussion, the methods of the present disclosure are not limited to the particularly illustrated order or arrangement. The various steps of the method 200 can be omitted, rearranged, combined, and/or adapted in various ways without deviating from the scope of the present disclosure.

At 202, a computing system can obtain input data. The input data may be speech audio data, protein data, spectrograph data, or a variety of other forms of data.

At 204, the computing system can process the input data with a conformer model. Processing of the input data can include the processing of the input data with one or more conformer blocks. The conformer blocks may include a first feed-forward block, a second feed-forward block, a convolution block, and a self-attention block. The first feed-forward block may process the input data and generate first feed-forward output data. The self-attention block may process the first feed-forward output data and generate attention output data. Next, the convolution block may process the attention output data and generate convolution output data. Lastly, the second feed-forward block may process the convolution output data and generate a second feed-forward output data. The second feed forward output data may be the conformer output data. In some implementations, the second feed-forward output data can be further processed by a layernorm block and generate normalized output data.

At 206, the computing system can generate output data. The output data may be a data descriptive of a variety of predictions or inferences including, but not limited to, text data descriptive of speech recognized from an audio data set or spectrograph data set, determined protein synthesis, or sound separation. The output data can include output data based at least in part on global interactions and local correlations learned or captured from the input data.

Figure 3:
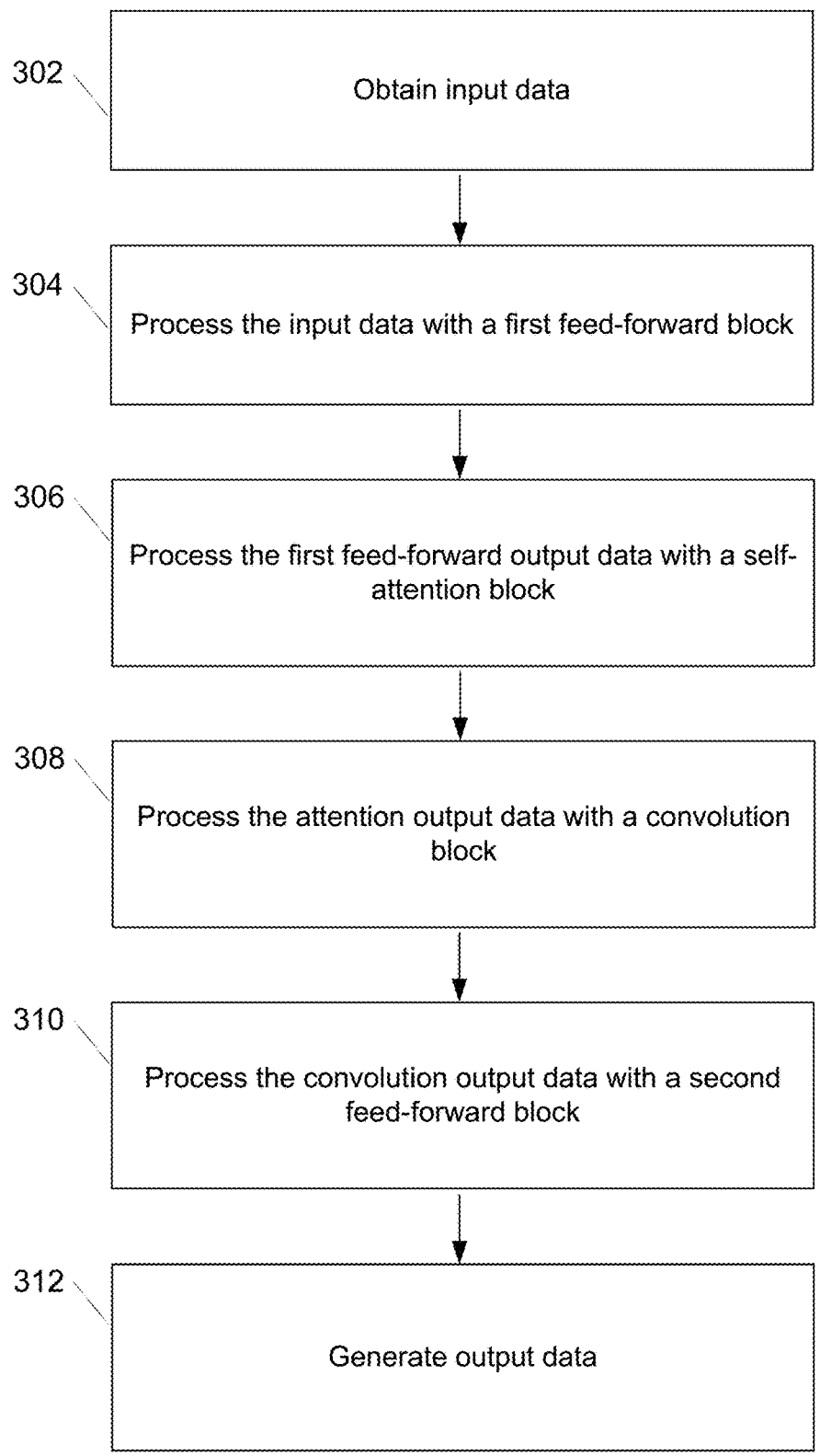
FIG. 3 depicts a flow chart of an example method for generating output data with a conformer model according to example embodiments of the present disclosure.

FIG. 3 depicts a flow chart diagram of an example method to perform according to example embodiments of the present disclosure. Although FIG. 3 depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure.

At 302, a computing system can obtain input data. Depending on the determined task, the input data may include text data, audio data, or any other form of data.

At 304, the computing system can process the input data with a first feed-forward block. The first feed-forward block may include a variety of sub-blocks, including, but not limited to, a layernorm block, a linear transformation block, a swish activation block, and a dropout block. The first feed-forward block may generate a first feed-forward output data in which the self-attention block may process as input data.

At 306, the computing system can process the first feed-forward output data with a self-attention block. The self-attention block may process first feed-forward output data to generate attention output data in which the convolution block may process as input data. The attention output data may include data descriptive of global interactions in the input data. The self-attention block may include a variety of sub-blocks, including, but not limited to, a layernorm block, a multi-head attention block, and a dropout block.

At 308, the computing system can process the attention output data with a convolution block. The convolution block may process the attention output data to generate convolution output data in which the second feed-forward block may process as input data. The convolution output data may include data descriptive of local correlations in the input data. The convolution block may include a variety of sub-blocks, including, but not limited to, a layernorm block, a pointwise convolution block, a GLU activation block, a 1D depthwise convolution block, a batchnorm block, a swish activation block, and a dropout block. In some implementations, the batchnorm block can be replaced with a group norm block.

At 310, the computing system can process the convolution output data with a second feed-forward block. The second feed forward block may include a variety of sub-blocks, including, but not limited to, a layernorm block, a linear transformation block, a swish activation block, and a dropout block. The second feed-forward block may generate a second feed-forward output data.

At 312, the computing system can generate output data. Depending on the determined task, the output data may include text data, audio data, or any other form of data. The output data may be the second feed-forward output data or a normalized version of the second feed-forward output data.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system for efficiently processing data which accounts for both local and global dependencies, comprising:
   one or more processors;
   one or more non-transitory computer-readable media that collectively store:
      a machine-learned conformer model, wherein the machine-learned conformer model comprises:
         a first half-step feed-forward block configured to process a block input to generate a first feed-forward output, wherein the first half-step feed-forward block comprises half-step residual weights;
         a self-attention block configured to perform self-attention to process the first feed-forward output to generate an attention output;
         a convolutional block configured to receive and process the attention output of the self-attention block to generate a convolutional output; and
         a second half-step feed-forward block configured to process the convolutional output of the convolutional block to generate a second feed-forward output, wherein the second half-step feed-forward block comprises half-step residual weights; and
      instructions that, when executed by the one or more processors, cause the computing system to perform operations, the operations comprising:
   obtaining input data; and
   processing the input data with the machine-learned conformer model to generate output data, wherein processing the input data with the machine-learned conformer model comprises determining position-wise local features and content-based global interactions based on processing the block input associated with the input data with the first half-step feed-forward block followed by processing with the self-attention block, the convolutional block, and the second half-step feed-forward block.

2. The system of claim 1, wherein the machine-learned conformer model further comprises:
   an audio encoder configured to encode the input data to generate the block input.

3. The system of claim 2, wherein the audio encoder comprises convolution subsampling layer.

4. The system of claim 1, wherein processing the input data with the machine-learned conformer model to generate the output data comprises:
   processing the input data with the first half-step feed-forward block to generate the first feed-forward output;
   processing the first feed-forward output with the self-attention block to generate the attention output;
   processing the attention output with the convolutional block to generate the convolutional output;
   processing the convolutional output with the second half-step feed-forward block to generate the second feed-forward output; and
   generating the output data based on the second feed-forward output.

5. The system of claim 4, wherein processing the input data with the machine-learned conformer model to generate the output data further comprises:
   adding variational noise to perform regularization.

6. The system of claim 1, wherein the machine-learned conformer model was trained on labeled speech data.

7. The system of claim 6, wherein the machine-learned conformer model was further trained on an additional dataset comprising a text-only corpus.

8. The system of claim 1, wherein the machine-learned conformer model further comprises a single layer decoder.

9. The system of claim 8, wherein the single layer decoder comprises a long short-term memory recurrent neural network.

10. The system of claim 1, wherein the convolutional block comprises a layer normalization block, a first pointwise convolution block, a plurality of activation blocks, a depthwise convolution block, a second pointwise convolution block, and a dropout block.

11. A computer-implemented method for efficiently processing data which accounts for both local and global dependencies, the method comprising:
   obtaining, by a computing system comprising one or more processors, input data;
   processing, by the computing system, the input data with a conformer model, wherein the conformer model comprises:
      a first half-step feed-forward block configured to process a block input to generate a first feed-forward output, wherein the first half-step feed-forward block comprises half-step residual weights;
      a self-attention block configured to perform self-attention to process the first feed-forward output to generate an attention output;
      a convolutional block configured to receive and process the attention output of the self-attention block to generate a convolutional output; and
      a second half-step feed-forward block configured to process the convolutional output of the convolutional block to generate a second feed-forward output, wherein the second half-step feed-forward block comprises half-step residual weights;
   wherein processing the input data with the conformer model comprises determining position-wise local features and content-based global interactions based on processing the block input associated with the input data with the first half-step feed-forward block followed by processing with the self-attention block, the convolutional block, and the second half-step feed-forward block; and
   in response to processing the input data with the conformer model, generating, by the computing system, an output data.

12. The method of claim 11, wherein the input data comprises audio data, and wherein the output data comprises text data descriptive of speech recognition for the audio data and further comprises sound separation data for the audio data.

13. The method of claim 11, wherein the output data is generated based on determining global interactions and local correlations from the input data.

14. The method of claim 13, wherein the attention output is descriptive of the global interactions determined by the self-attention block.

15. The method of claim 13, wherein the convolutional output is descriptive of the local correlations determined by the convolutional block.

16. The method of claim 11, wherein the input data comprises spectrograph data descriptive of human speech, and the output data comprises text data descriptive of speech recognized data for the human speech.

17. One or more non-transitory computer-readable media that collectively store instructions that, when executed by one or more computing devices, cause the one or more computing devices to perform operations, the operations comprising:
  accessing data descriptive of a machine-learned conformer model that comprises one or more conformer blocks, each of the one or more conformer blocks configured to process a block input to generate a block output, each of the one or more conformer blocks comprising:
    a first half-step feed-forward block configured to process the block input to generate a first feed-forward output, wherein the first half-step feed-forward block comprises half-step residual weights;
    a self-attention block configured to perform self-attention to process the first feed-forward output to generate an attention output;
    a convolutional block configured to receive and process the attention output of the self-attention block to generate a convolutional output; and
    a second half-step feed-forward block configured to process the convolutional output of the convolutional block to generate a second feed-forward output, wherein the second half-step feed-forward block comprises half-step residual weights; and
  obtaining input data; and
  processing the input data with the machine-learned conformer model to generate output data, wherein processing the input data with the machine-learned conformer model comprises determining position-wise local features and content-based global interactions based on processing the block input associated with the input data with the first half-step feed-forward block followed by processing with the self-attention block, the convolutional block, and the second half-step feed-forward block.

18. The one or more non-transitory computer-readable media of claim 17, wherein the convolutional block comprises a convolutional neural network.

19. The one or more non-transitory computer-readable media of claim 17, wherein the self-attention block comprises a self-attention model that is part of a transformer model.

20. The one or more non-transitory computer-readable media of claim 17, wherein the convolutional block and the self-attention block are between the first half-step feed-forward block and the half-step second feed-forward block.

* * * * *